Patented June 5, 1951

2,555,587

UNITED STATES PATENT OFFICE 2,555,587

METHOD OF BAKING LIQUID COATING COMPOSITIONS

John R. Fisher, Jr., Newport News, Va., and Ivan Kenis, Dayton, Ohio, assignors to Industrial Metal Protectives, Inc., Dayton, Ohio, a corporation of Delaware No Drawing. Application March 22, 1948, Serial No. 16,397

4 Claims. (Cl. 34—22)

This invention deals with a method of baking protective coatings.

This application is a continuation-in-part of the copending application of John R. Fisher, Jr. and Ivan Kenis filed February 24, 1947, bearing Serial Number 730,529, and entitled "Method of Baking Zincilate Coatings," now abandoned.

Coatings of the metal dust and silicate have been baked heretofore by heating the coated articles in an oven in which the necessary temperature was created by electricity, gas, oil, or by means of infra-red lamps. Oven baking, however, is not applicable in the case of large structures, such as bridges, ship hulls, and other bulky construction elements which, however, represent the most important field of application for metal dust-silicate coatings.

It is an object of this invention to provide a method of baking coatings which does not necessitate the use of a baking oven.

It is another object of this invention to provide a method of baking coatings which may be carried out in situ, which means that the articles to be baked do not have to be removed from their location.

It is another object of this invention to provide a method of baking coatings, the applicability of which is not dependent upon the size of the articles to be treated.

It is still another object of this invention to provide a method of baking coatings which requires a very short period of time.

It is still another object of this invention to provide a method of baking coatings with which only parts of an article may be treated.

It is still another object of this invention to provide a method of baking coatings with which uncoated sections located adjacent to said coated areas may be kept at low temperatures without any special means or precaution while said coated areas are baked.

It is still another object of this invention to provide a method of baking coatings in which the coated articles do not have to be handled prior to baking so that there is hardly any possibility of the coating becoming damaged or marred while still soft.

One method by which these objects may be accomplished is by applying a controlled and directed flame to the coating to be baked. The flame to be used for the baking process of this invention may be heated by any combustible gas, preferably in a compressed state, such as an oxygen-acetylene mixture, bottled gas, natural gas, synthetic gas, and the like. In the case of metal dust-silicate coatings, for which the new method is particularly advantageous, the flame is preferably adjusted so that the temperature on the coated surface ranges from 250 to 650° F. It is advisable that the oxygen content be controlled as closely to the stoichiometric quantity required as possible, because an excess of oxygen will cause changes in the surface of the coating, whereas a reducing flame is liable to deposit soot on the coating.

In carrying out the method above outlined, the flame is moved or played over an area of several square inches for a period of several minutes, and an adjacent area of similar size is then baked whereby it is wise to see to it that the two successively treated areas overlap so that the entire surface will be sufficiently baked.

The time of treatment is greatly dependent on a number of factors, such as the thickness of the base metal, the temperature of the flame, the prevailing ambient temperature and also the shape of the structure, since protruding angles and edges will dissipate the heat faster than will flat surfaces.

Another method of attaining the objects above indicated as being desirable is to employ a "transient" flame of a much higher temperature than that above indicated and which has the characteristics of a "brush" flame.

In carrying out this latter method, the step of predrying the coating is included as an essential element. This means that the coating is first allowed to dry under the influence of ambient temperature. A "brush" flame which is preferably generated from an oxygen-acetylene source and having a temperature of about 6300° F. is then moved across the dried coating.

While the speed at which the brush flame is caused to traverse the coating may vary with different conditions, the invention has particularly in mind a speed of about ten feet a minute. While the temperature of the brush flame is comparatively high, the fact that it is never held at rest over any given area results in a good setting without any deleterious effects other than the formation of a slight oxide which is negligible.

If both sides of an article have been coated, the same flame-baking method is preferably applied to both surfaces.

It is obvious that these flame-baking methods have a great many advantages over the conventional oven baking methods, and this is true particularly if large-sized structures are to be treated. In this latter case, it is not necessary to erect huge baking furnaces, nor to dismantle the structures. The new methods also avoid handling of the coated articles and thus damaging of the coating before it has become hardened. The methods are particularly superior to oven baking in cases where only parts of an article or structure are to be coated and baked while adjacent areas are to be prevented from becoming heated.

It will be understood that while there have been described herein certain specific embodiments of the invention, it is not intended thereby to have it limited to or circumscribed by the specific details given in view of the fact that this invention is susceptible to various modifications and changes which come within the spirit of this disclosure and the scope of the appended claims.

We claim:

1. In the setting of a metal dust-silicate protective coating, the method comprising the steps of: (a) predrying said coating, and (b) then moving a brush flame having a temperature of about 6300° F. across said coating.

2. In the setting of a metal dust-silicate protective coating, the method comprising the steps of: (a) predrying said coating, and (b) then moving a brush flame having a temperature of about 6300° F. across said coating at a rate of about ten feet a minute.

3. In the setting of a metal dust-silicate protective coating, the method comprising the steps of: (a) predrying the coating by exposure to ambient temperature, and (b) then moving a flame having a temperature of about 6300° F. across said dried coating.

4. In the setting of a metal dust-silicate protective coating, the method comprising the steps of: (a) predrying the coating by exposure to ambient temperature, and (b) then moving a brush flame having a temperature of about 6300° F. across said dried coating at the rate of about ten feet a minute.

JOHN R. FISHER, Jr.
IVAN KENIS.

REFERENCES CITED

The following references are of record in the file of this patent:

UNITED STATES PATENTS

| Number | Name | Date |
|--------|------|------|
| 14,163 | Moestue | Jan. 29, 1856 |
| 234,480 | Johnson | Nov. 16, 1880 |
| 1,795,703 | Baur | Mar. 10, 1931 |
| 2,016,125 | Snow | Oct. 1, 1935 |
| 2,099,162 | Eberlin | Nov. 16, 1937 |
| 2,419,080 | Kraus | Apr. 15, 1947 |